(12) United States Patent
Veldhuis et al.

(10) Patent No.: US 6,377,716 B1
(45) Date of Patent: Apr. 23, 2002

(54) OPTICAL INTENSITY MODULATOR AND SWITCH COMPRISING THE SAME

(75) Inventors: G. J. Veldhuis, Hengelo; P. V. Lambeck, Enschede; M. Diemeer, Hummelo, all of (NL); T. H. Hoekstra, Epinburgh (GB)

(73) Assignee: JDS Uniphase Inc., Nepean (CA)

( * ) Notice: Subject to any disclaimer, the term of this patent is extended or adjusted under 35 U.S.C. 154(b) by 0 days.

(21) Appl. No.: 09/397,080

(22) Filed: Sep. 16, 1999

(30) Foreign Application Priority Data

Sep. 16, 1998 (EP) ............................................. 98203090

(51) Int. Cl.⁷ ........................... G02F 1/01; G02F 1/035; G02F 1/295; G02B 6/26
(52) U.S. Cl. ...................... 385/1; 385/2; 385/9; 385/40
(58) Field of Search ............................ 385/1, 2, 8, 9, 385/40

(56) References Cited

U.S. PATENT DOCUMENTS

| | | | |
|---|---|---|---|
| 4,753,505 A | * 6/1988 | Mikami et al. | 350/96.13 |
| 5,173,956 A | * 12/1992 | Hayes | 385/16 |
| 5,623,566 A | * 4/1997 | Lee et al. | 385/24 |
| 5,892,863 A | * 4/1999 | Presby | 385/16 |

FOREIGN PATENT DOCUMENTS

JP 03036135 1/1991 ........... G02F/1/295

OTHER PUBLICATIONS

European Search Report 98 20 3090 Feb. 18, 1999.
"A Fibre Thermo–Optic Attenuator" S.K. Morshnev et al. Soviet Journal of Communications, Technology & Electronics Sep. 1985, vol. 30, No. 9, pp 148–150.
"Thermooptic fibre switch" A.A. Zatykin et al. Soviet Journal of Quantum Electronics vol. 15, No. 1, Jan. 1985 pp. 135–137.
"Pigtailed thermo–optic 1x2 switch in polymer: Design and experimental evaluation" H. Lausen et al. Proceedings of the annual conference on European fibre optic communications and networks Jun. 21, 1994 pp. 99–101.
European Patent Application 0 642 052 A1 Mar. 8, 1995 p. 3, line 8; p. 4, line 50, figure 1.

* cited by examiner

Primary Examiner—Georgia Epps
Assistant Examiner—Tim Thompson
(74) Attorney, Agent, or Firm—Lacasse & Associates; Randy W. Lacasse; Kevin E. Greene

(57) ABSTRACT

An optical intensity modulator is disclosed which comprises a waveguide containing a core adjacent to at least one cladding layer and exhibits a refractive index n(core) different from the refractive index n(cl) or the cladding layer, where the waveguide is a bent channel waveguide and the intensity modulator contains a heater or cooler for altering the temperature at or near the bend. The core and the cladding layer exhibit different thermo-optic coefficients at the bend such that the contrast between n(core) and n(cl) can be changed by altering the temperature. The optical intensity modulator is more compact in size and more efficient with regard to energy consumption. The invention also pertains to thermo-optic switches and thermo-optic cascaded switches comprising the optical intensity modulator and to the use of the optical intensity modulator as a tunable attenuator.

20 Claims, 2 Drawing Sheets

OPTICAL INTENSITY MODULATOR AND SWITCH COMPRISING THE SAME

CROSS-REFERENCE TO RELATED APPLICATIONS

"Not Applicable"

STATEMENT REGARDING FEDERALLY SPONSORED RESEARCH OR DEVELOPMENT

"Not Applicable"

REFERENCE TO A MICROFICHE APPENDIX

"Not Applicable"

BACKGROUND OF THE INVENTION

1. Field of the Invention

The invention pertains to an optical intensity modulator which comprises a waveguide containing a core adjacent to at least one cladding layer and exhibits a refractive index n(core) different from the refractive index n(cl) of the cladding layer.

Such optical intensity modulators are known from, for instance, Akkari et al.,

2. Description of the Related Art

*Journal of Non-Crystalline Solids* 187 (1995) 494–497.

This publication concerns a thermo-optic mode extinction modulator where mode extinction occurs due to the counteracting effect that arises from having a guiding polymer thin film with a negative thermo-optic coefficient as a core and a glass substrate with a positive thermo-optic coefficient. All discussed devices were made of polyurethane varnish on BK-7 glass substrates. A stripeheater located on top of a protective layer (PMMA) was put over the polyurethane core layer used to control the mode extinction via the thermo-optic effect. Akkari et al. achieved complete mode extinction at reported switching times from cut-off (full extinction) to total transmission in the order of 6.7 ms. However, the known devices leave some room for improvement. Firstly, due to the stacked layer structure of the guiding polymer thin film and the glass substrate, the optical intensity modulator described above is relatively large in size, which renders it less suitable for application in small and compact devices. Secondly, also due to the stacked layer configuration there is no control, over the direction of the generated radiation mode. Thirdly, in order to increase efficiency, it is desirable that comparatively small temperature changes result in an efficient coupling out of the propagating mode. Being able to apply low temperatures would have the additional advantage of avoiding degradation of the mostly polymeric material used for optical intensity modulators. It is noted that EP 0219069 also describes a rather complex light modulator that comprises a stack of a waveguide layer and an adjacent layer normally exhibiting a refractive index smaller than that of the waveguide layer, at least one of these layers being formed of a material whose refractive index changes by application of energy. An energy applicator is provided in at least in one of these layers, and a dielectric grating is positioned at the surface of the adjacent layer over a section where energy is applied by the energy applicator. When a change in refractive index is caused to arise in the waveguide layer and/or the adjacent layer, the guided mode is radiated out of the stack. Like Akkari, also EP 0219069 only refers to stacked layer geometry, and radiation of the guided mode out of the waveguide layer is based on transversal differences in refractive indices. Although the interaction with the grating described in EP 0219069 renders the direction of the generated radiation mode more easily controllable and improves the extinction ratio of the modulated light, the items discussed in Akkari with respect to the geometry of the stack and the temperature to be applied also apply for EP 0219069.

BRIEF SUMMARY OF THE INVENTION

This invention has for its object to reduce or even obviate the said disadvantages. This is achieved by an optical intensity modulator as described in the first paragraph which waveguide is a bent channel waveguide and that contains means for altering the temperature at or near the bend and that at least at the bend, the core and the cladding layer exhibit different thermo-optic coefficients such that the contrast between n(core) and n(cl) can be changed by altering the temperature.

In contrast to the prior art devices, the optical intensity modulator of the present invention comprises a bent channel waveguide and thus the waveguide has a different structure. Such a structure, which is neither described nor taught by Akkari or in EP 0219069, reduces the size of the optical intensity modulator considerably compared to the stacked layer type and renders the device more compact. A particular advantage of a channel waveguide lies also in the fact that it renders the optical intensity modulator compatible to optical fibers which can be connected to that device.

DETAILED DESCRIPTION OF THE INVENTION

The basic principle of the device according to the present invention that renders it suitable as an intensity modulator and also improved compared to the devices of the prior can be outlined as follows.

In order to attain guiding of the propagating mode usually at a given temperature (which often is the room temperature) the refractive index of the core is higher than that of the adjacent cladding layer thus keeping the propagating mode in the core of the waveguide. To achieve attenuation, it is, however, desired to efficiently couple out this propagating mode. In the waveguide of the present invention, core and cladding layer additionally show different thermo-optic coefficients which leads to the fact that when changing the temperature the difference of refractive indices of core and cladding layer either increase or decrease. As a consequence, light that propagates in the core will either stay there or couple out of the core (hereinafter referred to as loss). As a matter of fact this depends on the materials used for core and cladding layer and the temperature change applied (cooling or heating), which together form the lateral refractive index contrast of the waveguide.

The term thermo-optic coefficient (toc) is defined by the change of the refractive index of a given material upon changing of the temperature. It can be expressed by the formula (1):

$$toc(a) = \frac{dn(a)}{dT} \qquad (1)$$

with:
  toc(a)=thermo-optic coefficient of material (a)
  n(a)=refractive index of material (a)
  T=temperature in Kelvin The refractive index of a material showing a positive thermo-optic coefficient thus will increase upon temperature rise and decrease, if the material is cooled. As a consequence, the refractive index of a material showing a negative thermo-optic coefficient thus will decrease upon heating and increase, if the material is cooled. the thermo-optic coefficient is known to the person of ordinary skill in the art and need no further elucidation here. When two materials with both different refractive indices and thermo-optic coefficients are combined, whereas one is forming the core and the other the cladding layer of a waveguide, a plurality of effects are possible that can be used for intensity modulation.

If, e.g. the refractive index of the core n(core) is at room temperature higher than the refractive index of the cladding layer and further the toc(core) of the core is negative, whereas the toc(cl) of the cladding layer is positive (such a combination is possible, when using a polymeric material for the core and an inorganic material for the cladding layer), at room temperature the light will remain in the core, provided the contrast in refractive index of core and cladding is high enough. Upon heating of the waveguide the refractive index of the core decreases and that of the cladding layer increases. If the refractive index contrast is now lowered sufficiently, part of the light will be radiated out of the waveguide, the exact fraction depending on the value of that contrast. By adjusting the contrast value in such a way, the precise transmitted power can be controlled.

A similar effect can be achieved if both toc(core) and toc(cl) of the aforementioned waveguide are negative, provided that toc(core) has a greater absolute value, which leads to a faster decrease of n(core) than of n(cl) upon heating (such combination is achievable, when using e.g. a rubbery polymer for the core and a glassy polymer for the cladding layer).

In both cases outlined above the loss (i.e. coupling-out of the propagating mode of the core) is obtained upon rising the temperature. It is clearly in the scope of the present invention and also clear to those skilled in the art that also other combinations are possible.

If, e.g. an inorganic material is used as core having an refractive index n(core), which is at room temperature lower than the (e.g. polymeric) material of the cladding layer n(cl), but the toc(core) of the core material is positive and the toc(cl) of the cladding layer negative, this will lead to a high loss of light at room temperature. Upon heating, however, the refractive index n(core) of the core will increase whereas n(cl) of the cladding layer will go down. At a certain temperature the contrast between n(core) and n(cl) is such that the light will predominately remain in the core. Attenuation thus will be obtained when cooling such a system down from this certain temperature to e.g. room temperature.

Off course, it is also possible to construct an intensity modulator in such a way that at room temperature there is virtually no loss of light, whereas upon cooling to a certain temperature below room temperature the attenuation (coupling out of the light of the core) will take place. Means for cooling, such as peltier elements, are known to those skilled in the art.

It is, off course, also possible to combine for core and cladding materials, of which one shows an toc which is zero. In this case it is merely a matter of controlling the refractive index change with respect to temperature of the other component.

A person skilled in the art is capable of designing intensity modulators by making use of the above outlined principle, thereby varying the materials applied for core and cladding layer with respect to the desired refractive indices and/or thermo-optic coefficients, introducing means for heating or cooling to the waveguide, in order to achieve or to prevent coupling out (loss) of light from the core.

A particular advantage of the intensity modulator according to the present invention is that the effects as outlined in the preceding paragraphs will be much more pronounced if the waveguide is bent at the location of a refractive index contrast due to the strong dependence of light transmission through a waveguide bend on the waveguide lateral refractive index contrast. This dependence makes it e.g. possible to achieve a high loss of the propagating light by only changing the temperature at distinct locations, i.e. at or near the bends.

Due to the fact that furthermore the direction and the radii of the bends can be chosen when designing the bent channel waveguide, it is possible to control the direction of the light, when coupling out. This is especially advantageous when absorption of the coupled-out light, e.g. by means of absorbers, is desired. Therefore, due to bend geometry it is sufficient, although in a non-restrictive way, to selectively heat or cool only a fraction of the waveguide, i.e. the bends, and thus to apply an overall lower power to obtain a high efficiency of the optical intensity modulators. That renders the optical intensity modulator of the present invention more economical than those of the prior art.

As already mentioned earlier it is desired to apply relatively low temperatures in order to avoid degradation and/or too high stress of the material used in optical intensity modulators. It is therefore preferred that the temperature changes applied to achieve the alteration in contrast between n(core) and n(cl) is between 20 and 100 K.

For many applications, such as in thermo-optic devices, it is preferred to design the intensity modulator that the attenuation due to contrast changes come apparent when heating up the device, say, e.g., from about room temperature to about 50° C.

It is therefore another preferred embodiment of the invention that at room temperature the refractive index n(core) of the core is higher than the refractive index n(cl) of the cladding layer and that contrast between n(core) and n(cl) of the optical intensity modulator decreases with an increase in temperature.

It goes without saying that the bends of the waveguide must be designed in such a way that sufficient transmission of the light through the core is achieved as long as coupling-out is not desired. This can be done by adjusting the bend radii during fabrication of the intensity modulator. It is preferred to select the radius of the bend in such a way that transmission through the core of the channel waveguide is reduced from greater than 80% to less than 10% by activating the means for increasing the temperature at or near the bend, in order to obtain sufficient transmission in the beginning and sufficient extinction after heating up.

In a further preferred embodiment of the present invention the optical intensity modulator may be built up, e.g., as follows.

Underneath the bent waveguide structure there is a support, e.g., a glass or silicon substrate. On the substrate the following successive components can be identified: a lower cladding layer, a core, and an upper cladding layer. The cladding layer material may be inorganic, such as glass, or a polymeric material. Said cladding layers have an index of refraction lower than that of the core. The core, which comprises the actual waveguiding design, may be made of inorganic or polymeric material.

The polymers used for these components are so-called optical polymers. The refractive index of the optical polymers used will generally be within the range of from 1.4 to 1.8.

Optical polymers are known, and the person of ordinary skill in the art is able to choose polymers having the appropriate refractive indices, or to adapt the refractive indices of polymers by chemical modification, e.g., by introducing monomeric units that affect the refractive index.

As all polymers exhibit a thermo-optical effect, basically any polymer having sufficient transparency for the wavelength used can be employed in the core of the waveguide. Said transparency requirement also holds for the cladding layer. Particularly suitable optical polymers include polyacrylates, polycarbonates, polyimides, polyureas, and polyarylates.

A planar or slab waveguiding structure can be transferred into a structure comprising channel waveguides with a pattern of light paths (the specific design) in various manners. Methods to achieve this are known in the art. For example, it is possible to introduce such a pattern by removing portions of the slab waveguide, e.g., by means of wet-chemical or dry-etching techniques (reactive ion etching, laser ablation), and to optionally fill the gaps formed with a material having a lower index of refraction. Or, e.g., photosensitive material that can be developed after irradiation may be used. In the case of a negative photoresist the photosensitive material is resistant to the developer after irradiation, and the portions of the material that were not subjected to irradiation can be removed. It is preferred to use a positive photoresist, and to define the channels by means of an irradiation mask covering the waveguide portions that will form the channels. The irradiated material then is removed using developer, after which a material of lower refractive index is applied.

Of course, the optical intensity modulator according to the present invention is not restricted to a structure of lower cladding layer, core, and upper cladding layer. In principle, it can comprise additional claddings, such as buffer layers, protective layers, or core-matching layers.

The various layers can be applied by spincoating, which in case of inorganic materials requires the sol-gel technology. In order to be able to spincoat layer-on-layer, it is often necessary to cross-link one layer before applying the next layer. Therefore, the polymers used in the present invention are preferably rendered cross-linkable either by the incorporation of cross-linkable monomers or by mixing cross-linkers such as polyisocyanates, polyepoxides, etc. into the polymer.

As means for increasing the temperature the optical intensity modulator usually comprises, e.g., metal heaters or electrodes on top of the upper cladding layer. These heaters or electrodes are usually made of gold and/or metals such as chromium, nickel, titanium, copper, platinum or combinations or alloys thereof.

In a preferred embodiment of the present invention the core of the optical intensity modulator is made of a glassy polymer and at least one of the cladding layers adjacent to the core of an inorganic material, such as glass, fused silica and/or SiON (siliconoxide/nitride). Glassy polymers usually exhibit a thermo-optic coefficient in the order of $-10^{-4}$/K, whereas, e.g., that of fused silica is around $+10^{-5}$/K.

In another preferred embodiment of the invention a rubbery polymer is used to form the core and a glassy polymer is used to form at least one of the cladding layers adjacent to the core. Rubbery polymers usually exhibit a thermo-optic coefficient that—due to their higher thermal expansion—is three to five times higher than that of polymers in the glassy state. Typical values are in the order of $-5\times10^{-4}$/K.

In consequence, a further preferred embodiment of the present invention is an optical intensity modulator wherein a rubbery polymer is used to form the core and an inorganic material, such as glass, fused silica and/or SiON (siliconoxide/nitride) is used to form at least one of the cladding layers adjacent to the core.

It is preferred to use silicon for the substrates in the present invention. These substrates are readily available on the market, are of homogeneous thickness, and offer good heat sink properties. Furthermore, they are frequently used in integrated circuit techniques and apparatus.

The optical intensity modulator according to the invention, however, is not restricted to core/cladding layer structures on a substrate.

Therefore, in another preferred embodiment of the optical intensity modulator according to the present invention the optical intensity modulator comprises a bent tapered single mode optical fibre as the core surrounded by a polymer as the cladding layer.

In principle, again the materials for the core and the cladding layer can be widely chosen, so long as the above-mentioned requirements for the optical refractive index and the changes in optical refractive index with temperature are satisfied. Preferred is a bent tapered glass fibre that is embedded in a polymer, in particular preferred a rubbery polymer, as the cladding layer. The fabrication technique for such a configuration is similar to what is described by M. B. J. Diemeer et al., *Electron. Lett.*, Vol. 24, No. 8 (1988), 457, where it is applied for switching between two fibres in a fused coupler switch.

In another preferred embodiment the bent channel waveguide of the optical intensity modulator is a rolled-up or meandering waveguide. This geometry would enhance the bend loss, e.g. in the heated state, considerably, due to the increased number of bends.

The present invention also pertains to a thermo optic switch comprising at least one input and at least one output that comprises a heating means and an optical intensity modulator as described above. Common thermo-optical switches, such as switches based on the technology of BeamBox® (a registered trademark of Akzo Nobel Photonics) exhibit switching times of usually less than 2 ms. The switching properties are based on heat-induced refractive index modulations causing variations in the mode evolution. When switched the output of an optical waveguide in the off state, the output is desired to change its characteristics from virtually complete transmission for the propagating mode to virtually complete attenuation. Usually, however, thermo-optical switches suffer from the fact that a fraction of the propagating mode still remains in the waveguide that should have been brought to full attenuation by changing the refractive index and eventually leaves the switch in an undesired direction. This phenomenon is known to the person skilled in the art as crosstalk. The present invention provides an optical intensity modulator that due to its characteristics of different thermo-optic, coefficient and bends leads to a considerably better crosstalk performance, when used, e.g., in thermo-optic switches, as a result of a more efficient coupling-out of remaining light.

As mentioned above, in thermo-optic switches means for heating are used to cause the refractive index change. It is one particular advantage provided by the present invention that these heating means and the means for heating the bend of the channel waveguide can be integrated. This renders the claimed optical intensity modulator even more efficient and compact and facilitates the fabrication of thermo-optic switches comprising the optical intensity modulator. Another particular advantage is that in many cases bent channel waveguides are already present in thermo-optic switches, such e.g. in Y-switches. The reason for the introduction of bends is to keep the output channels sufficiently apart from each other, in order to achieve a desired off set, which is often in the order of 125 µm.

In another preferred embodiment the optical intensity modulator according to the invention is used in a switch that is present in the last stage of a cascaded switch.

Cascaded switches are known from WO 96/38756. In order to reduce crosstalk they are provided with an additional Y-splitter of which only one output path is a functional output path. When the functional output path is in the "off" state, the other branch is used for directing light into, in order to decrease the optical power in the functional output path, thus improving extinction and decreasing crosstalk. However, when the cascaded switch is provided with an optical intensity modulator of this invention as the last switch, it is possible to reduce crosstalk without the necessity of an additional branch.

It is noted that DE 3742331 refers to an optical glass fibre core (e.g. quartz) surrounded by a coat made from organic material (e.g. silicone), thus forming a waveguide. The light can be coupled out due to a difference in the thermo-optic coefficients of core and coat. This coupling-out is performed by a second waveguide (coupler), which is cooled by liquid nitrogen. The device has a length of about 1 m and is described as useful for temperature measurements between $-196°$ C. and $20°$ C. The principle, however, is different from that of the present invention, as a second waveguide is used that contacts at a particular location of the first waveguide, where the coupling-out occurs. Therefore, there are no bends in the device disclosed by DE 3742331. Bends would endanger the accuracy of the measurements, as there is the risk that a considerable fraction of the propagating mode would leave the waveguide at undesired locations.

In yet another embodiment the optical intensity modulator is used in a tunable attenuator. This is achieved by optical feedback via taps or waveguide temperature control by utilizing the temperature dependence of the heater stripes. The bend loss can be fixed at a certain value (for this reference is made to S. Suzuki et al., *J. Lightwave Technol.*, Vol. 12, No. 5 (1994) 790) and that renders the device suitable as a tunable attenuator.

The invention is further illustrated by the following unlimitative example:

BRIEF DESCRIPTION OF THE SEVERAL VIEWS OF THE DRAWINGS

EXAMPLE 1

Device Fabrication

Figure 1:
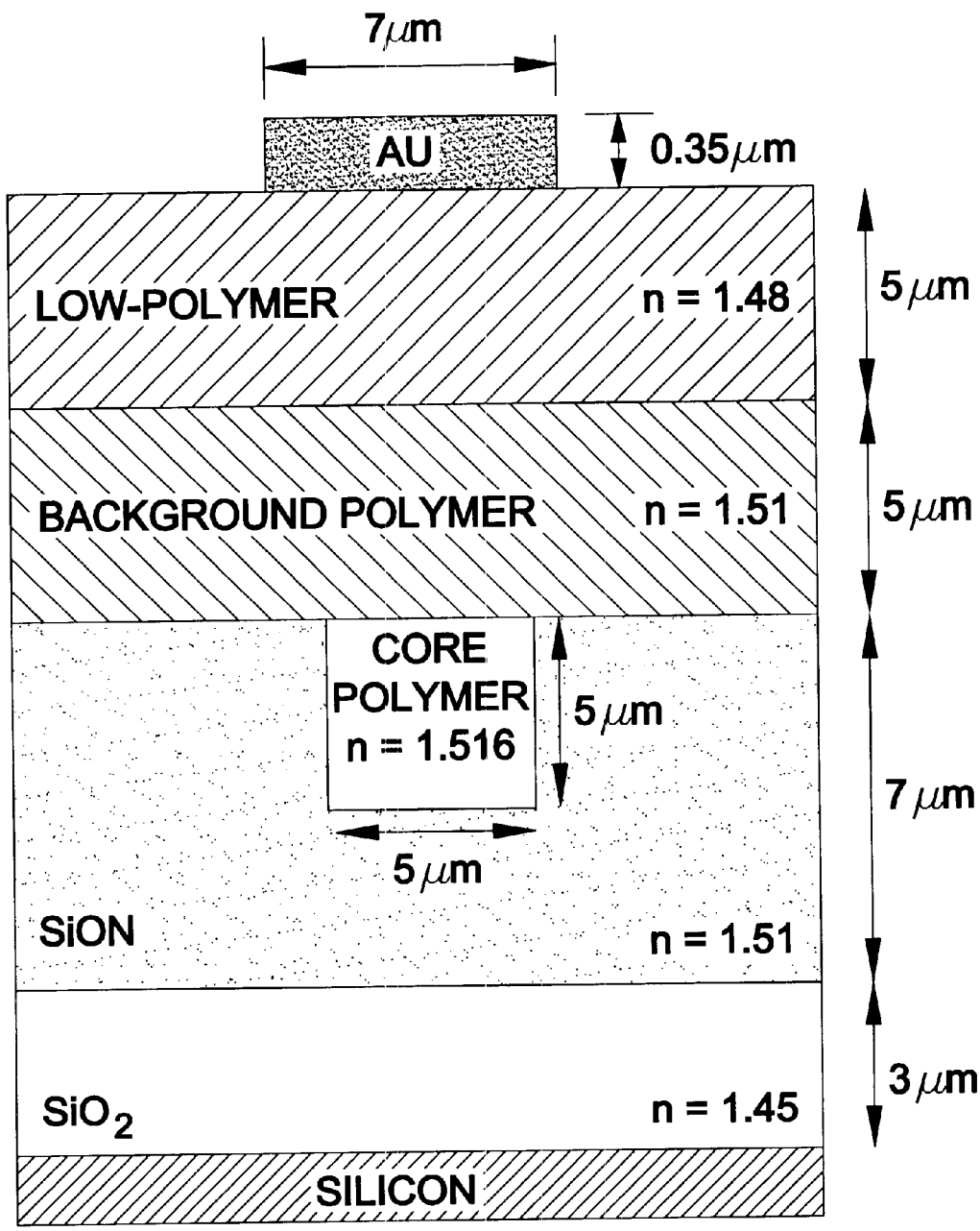

FIG. 1 schematically shows the arrangement of a typical optical intensity modulator according to the invention suitable for a wavelength of 1.55 µm. In this example the optical intensity modulator has a four-component structure on a substrate made of silicon dioxide. A typical route for the preparation of such an optical intensity modulator is as follows:

The first step in the fabrication process is the thermal oxidation of the silicon wafer, which yields a 3 µm thick $SiO_2$ layer. Next the SiON layer of 7 µm thickness was grown by plasma enhanced chemical vapor deposition. After sputtering a chromium masking layer, the waveguide was patterned by ordinary photolithography. The trenches for the waveguide channels were etched into the SiON layer by means of $CHF_3$ reactive ion etching (RIE). it was found to be essential that the photoresist layer used for the patterning of the chromium masking layer is left on it during the etching, in order to prevent redeposition of the chromium in the waveguide channels. In case no chromium was applied, etching resulted in very rough waveguide edges. The waveguides were square and the sidewalls were straight, i.e. the etch process is anisotropic.

A difficult step in the fabrication process is the deposition of the core polymer in the waveguide channel. After applying an adhesion promoter, the core polymer is spin casted on the wafer. After curing this layer, a polymer with good planarization characteristics and RIE characteristics nearly equal to that of the core polymer, was spun on top of the core to obtain a flat layer surface. After another curing step, the complete stack was etched down to the SiON by RIE with an $O_2$-plasma. Since the etching characteristics of the two layers are the same, the core polymer will finally only be present in the channel. Next the match polymer was spin casted and cured followed by application of the low index polymer layer.

The next step is the fabrication of the heater electrodes. For that a 20 nm thick titanium layer followed by a 350 nm thick gold layer were sputtered on the sample. The titanium serves as an adhesion layer between the gold and the polymer. The 7 µm wide electrode structure is then defined by photolithography.

Finally the wafer is diced to obtain the optical end faces. During the sawing the polymer is protected from damaging by a glass plate glued on top of the layer stack.

The contrasts and thicknesses of the layers are listed in Table 1 and were selected for an efficient fibre-chip coupling.

TABLE 1

| Component | Refractive index | Thickness (µm) |
|---|---|---|
| Low polymer | 1.48 | 5 |
| Match polymer | 1.51 | 5 |
| Core polymer | 1.516 | 5 |
| SiON | 1.51 | 7 |
| $SiO_2$ | 1.45 | 3 |

The electrodes on top of the low polymer layer were made of gold. Their thickness was 350 nm and they were 7 µm wide. The low polymer layer itself was chosen only to be thick enough and is not necessarily optimal.

Figure 3:
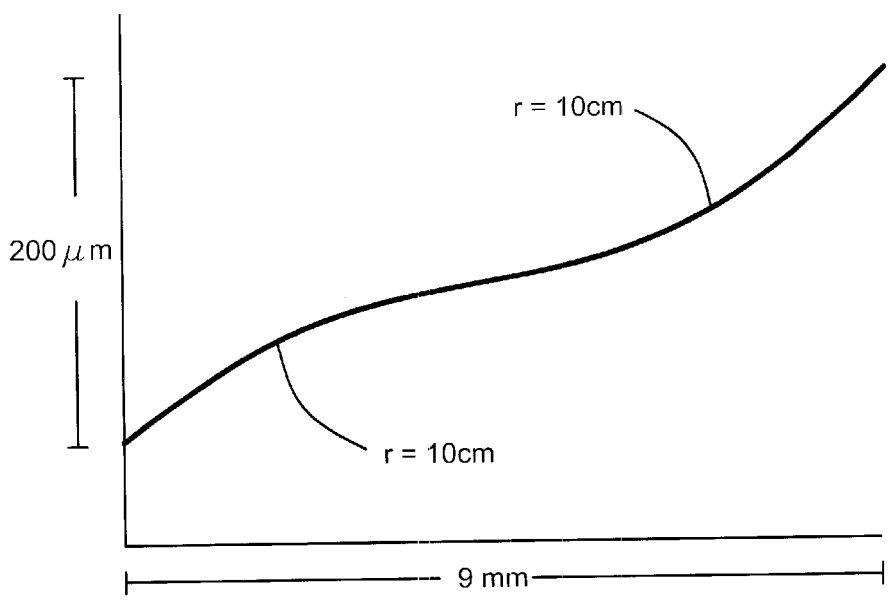

As shown in FIG. 3, illustrating a schematic top view of the waveguide layer of FIG. 1, the bends of the channel waveguide were adjusted in the form of S-bends. The bend radius was 10 cm at an offset of 200 µm and was obtained by model calculations performed using the beam propagation method (BPM) routine, a method that is known to the person of skill in the art. Results indicated that an S-bend exhibiting an offset of about 100 µm should have a bend radius of at least 1.5 cm, in order to ensure a transmission of at least 80% in the inactivated (unheated) state.

Experimental Results

Figure 2:
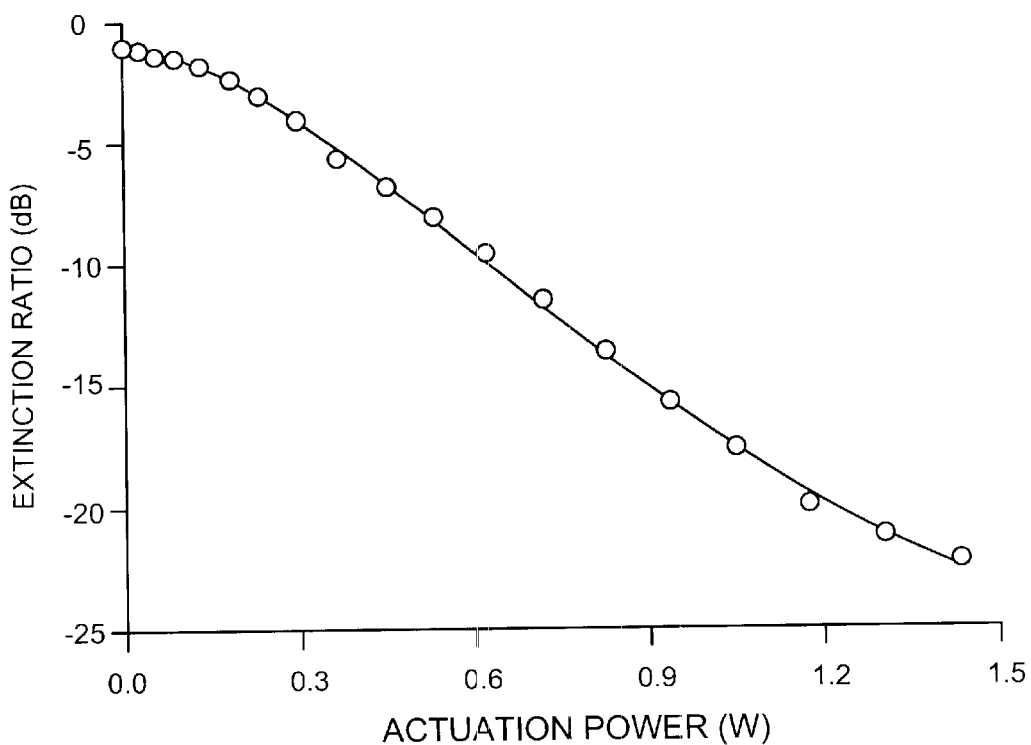

FIG. 2 shows the experimentally obtained dependency of the extinction of a modulator versus the applied power for a device of 9 mm length and an offset=200 µm. It is clear that the device qualitatively behaves as expected. When the applied power is increased to 1.5 W (at 20 V), the extinction ratio increases to 23 dB. Upon applying higher actuation powers, extinction ratios above 30 dB were even observed.

The straight waveguide attenuation at $\lambda=1.55$ µm was measured to be 1 dB/cm, a reasonably low value. The attenuation is mainly attributed to the N—H absorption peak, which is observed in SiON and to the roughness of the etched waveguide sidewalls. The first problem can be reduced by annealing the SiON, while it is expected that careful optimization of the $CHF_3$ RIE process will lead to smoother walls.

Before actuation the device showed an excess loss of 3.4 dB compared to that of a straight waveguide with the same length. From this value the refractive index contrast before actuation can be calculated to be Δn=0.004. The required refractive index change to obtain an extinction of 23 dB is Δn=0.0005.

What is claimed is:

1. An optical intensity modulator comprising:
    a bent channel waveguide having a core adjacent to at least one cladding layer which exhibits a refractive index n(core) different from a refractive index n(cl) of the cladding layer, the core and the cladding layer exhibiting different thermo-optic coefficients at a bend of the bent channel waveguide, the bent channel waveguide providing at least 80% transmission in an inactivated state; and,
    means for altering a temperature at or near the bend, such that the difference between n(core) and n(cl) can be changed by a combined Δn of less than 0.005 by altering the temperature.

2. The optical intensity modulator of claim 1, wherein at room temperature n(core) is greater than n(cl) and wherein the difference between n(core) and n(cl) decreases with increasing temperature.

3. The optical intensity modulator of claim 1 wherein the modulator comprises a substrate which contains a structure thereon comprising at least an upper cladding layer, a core, and a lower cladding layer.

4. The optical intensity modulator of claim 2 wherein the modulator comprises a substrate which contains a structure thereon comprising at least an upper cladding layer, a core, and a lower cladding layer.

5. The optical intensity modulator of claim 1 wherein the core is formed from a glassy or rubbery polymer and at least one of the cladding layers adjacent to the core is formed from an inorganic material or a glassy polymer.

6. The optical intensity modulator of claim 2 wherein the core is formed from a glassy or rubbery polymer and at least one of the cladding layers adjacent to the core is formed from an inorganic material or a glassy polymer.

7. The optical intensity modulator of claim 3 wherein the core is formed from a glassy or rubbery polymer and at least one of the cladding layers adjacent to the core is formed from an inorganic material or a glassy polymer.

8. The optical intensity modulator of claim 4 wherein the core is formed from a glassy or rubbery polymer and at least one of the cladding layers adjacent to the core is formed from an inorganic material or a glassy polymer.

9. The optical intensity modulator of claim 1 wherein the core is a bent tapered single mode optical fibre surrounded by a polymer as the cladding layer.

10. The optical intensity modulator of claim 2 wherein the core is a bent tapered single mode optical fibre surrounded by a polymer as the cladding layer.

11. The optical intensity modulator of claim 1 wherein the bent channel waveguide is a rolled-up or meandering waveguide.

12. The optical intensity modulator of claim 2 wherein the bent channel waveguide is a rolled-up or meandering waveguide.

13. A thermo optic switch comprising:
    at least one input;
    at least one output comprising
       heating means, and
       the optical intensity modulator of claim 1.

14. The thermo optic switch of claim 13, wherein at room temperature n(core) is greater than n(cl) and wherein the difference between n(core) and n(cl) decreases with increasing temperature.

15. The thermo optic switch of claim 13, wherein the core is formed from a glassy or rubbery polymer and at least one of the cladding layers adjacent to the core is formed from an inorganic material or a glassy polymer.

16. A thermo optic switch of claim 13 wherein the heating means for the output and the means for altering the temperature are integrated.

17. A thermo optic cascaded switch comprising as a last switch the optical intensity modulator of claim 1.

18. The thermo optic cascaded switch of claim 17, wherein the core is formed from a glassy or rubbery polymer and at least one of the cladding layers adjacent to the core is formed from an inorganic material or a glassy polymer.

19. A tunable attenuator which comprises the optical intensity modulator according to claim 1.

20. The tunable attenuator of claim 19 wherein at room temperature n(core) is greater than n(cl) and the difference between n(core) and n(cl) decreases with increasing temperature.

* * * * *